(12) United States Patent
Cai et al.

(10) Patent No.: US 7,805,597 B2
(45) Date of Patent: Sep. 28, 2010

(54) PARALLEL LINK RESET IN LINK BASED SYSTEM

(75) Inventors: Xiaohua Cai, Shanghai (CN); Yufu Li, Shanghai (CN); Zhijun Liu, Shanghai (CN); Geng Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 11/731,064

(22) Filed: Mar. 30, 2007

(65) Prior Publication Data

US 2008/0244256 A1 Oct. 2, 2008

(51) Int. Cl.
- G06F 9/00 (2006.01)
- G06F 9/24 (2006.01)
- G06F 15/177 (2006.01)

(52) U.S. Cl. .............................. 713/1; 713/2
(58) Field of Classification Search .............. 713/1, 713/2
See application file for complete search history.

(56) References Cited

U.S. PATENT DOCUMENTS

| | | | |
|---|---|---|---|
| 5,938,765 A * | 8/1999 | Dove et al. | 713/1 |
| 6,760,838 B2 * | 7/2004 | Owen et al. | 713/1 |
| 7,146,510 B1 * | 12/2006 | Helms et al. | 713/300 |
| 7,398,380 B1 * | 7/2008 | Lovett et al. | 713/1 |
| 2004/0098475 A1 * | 5/2004 | Zeitler et al. | 709/223 |

* cited by examiner

Primary Examiner—Thomas Lee
Assistant Examiner—Brandon Kinsey
(74) Attorney, Agent, or Firm—Trop, Pruner & Hu, P.C.

(57) ABSTRACT

A link based system including a plurality of processors is reset when transitioning from a slower speed to a higher speed mode during a booting process. One processor may coordinate the simultaneous establishment of link resetting of a plurality of other processors. In one embodiment, the processors may operate beginning with the farthest processor to reset their local links. Each processor sets its local links and if it determines, based on the speed of the link that the link has already been reset, it moves on to the next link.

12 Claims, 3 Drawing Sheets

PARALLEL LINK RESET IN LINK BASED SYSTEM

BACKGROUND

This relates generally to processor-based systems. In particular, it relates to link based systems.

Link based systems overcome bandwidth limitations on the front side bus based systems and reduce the number of side band signals. The common system interface link based system is a high speed point-to-point interconnection architecture between link based components.

When a system powers on, each of the links in the link based system between components work in slow speed mode initially. Then, the firmware configures the links to the complex and more effective high speed work mode. During this process, all of the links must be reset.

DETAILED DESCRIPTION

In accordance with some embodiments, a set of defined synchronization orders, as well as a set of synchronization flags, control all processors entrance into a link reset stage, carry out the link reset simultaneously in all the processors, and exit to continue the booting. During this parallel process, the reliability of transactions on the links is maintained. By using parallelism, the boot time may be reduced in some embodiments.

Figure 1:
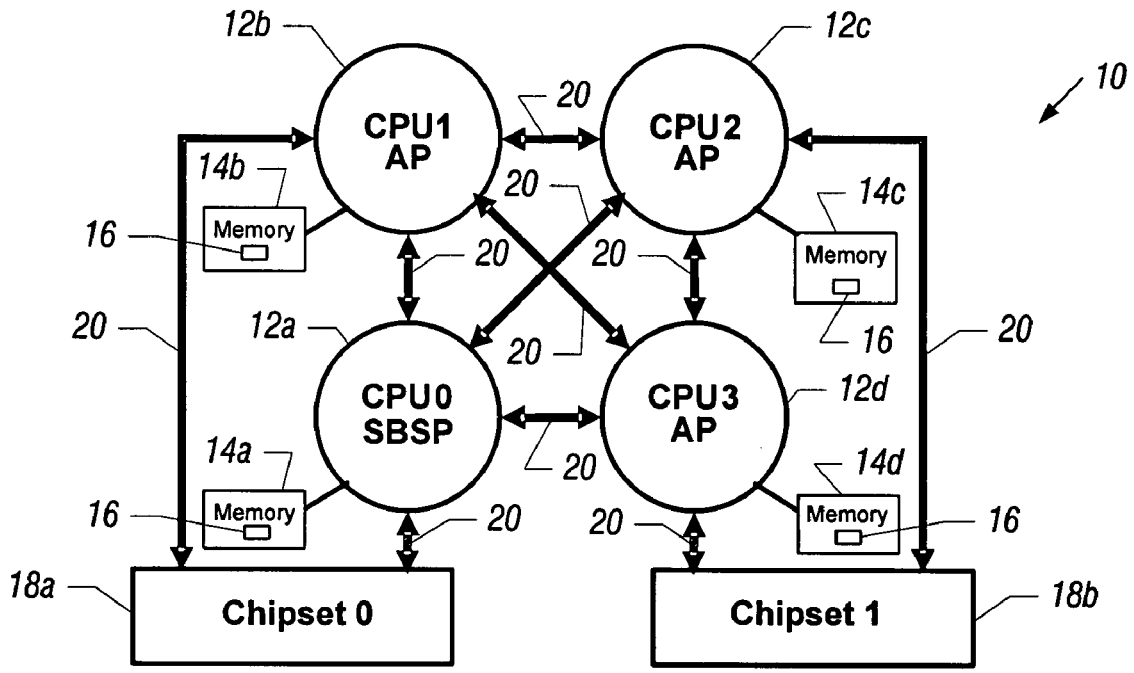
FIG. 1 is a system topology in accordance with one embodiment.

Referring to FIG. 1, a link based system may include a number of processors, indicated as processors 12a, 12b, 12c, and 12d. In one embodiment, a point-to-point interconnected multiple processor system may be established. Of course, more or less processors may be used in different embodiments. In one embodiment, the processors 12b, 12c, and 12d are application processors (AP). The application processors are processors which take part in local initialization, including a link reset controlled by a system bootstrap processor (SBSP) 12a. Each of the processors 12 may have a memory associated therewith, such as the memory 14a-14d. In addition, in one embodiment, two chipsets 18a and 18b are provided.

The links 20 extend between the processors 12 and the chipsets 18. Each of the links 20 must be reset when transitioning from a slower speed to a higher speed mode. If all the processors take part in the link reset for their local links simultaneously, booting may be more effective and may be quicker.

One issue that arises is that many links 20 extend between different processors. Thus, in a decentralized system where each processor 12 is involved in link resetting, the issue arises as to what happens when one processor resets a link and affects traffic from any processor/chipset combination traveling on the reset link.

In one embodiment, the system bootstrap processor 12a does not control the reset of every link in the system, but still controls the parallel process. Before starting the process, the routing infrastructure is set up and the topology has been discovered by the system. Therefore, the processor 12a has knowledge of the entire system and can access all of the components and the links freely.

In one embodiment, there may be two synchronization points, called the start and end points. The processor 12a uses a start point to trigger the application processors to start their local link reset. The processor 12a uses the end point to inform the application processors to continue the booting when the link resets of the entire system have been completed successfully.

Each application processor sets its local flag at success or failure, to inform the processor 12a of the result of its link reset and the processor 12a checks these flags at a checkpoint. On each application processor, there is a configuration and status register 16 that can be used to embody each of four flags. The register 16 may also be part of a processor 12. The flag link_reset_begin is set by the processor 12a to trigger each application processor to start the link reset at the start point. The flag link_reset_finish is used by the processor 12a to inform the other processors to continue booting and is used at the end point. The flag local_success is set by each application processor when its entire set of links have been reset successfully and is used during the checkpoint. Similarly, the flag local_failure is set by an application processor when it detects a failure or error during reset or if a timeout happens. It, too, is also set during the checkpoint.

Figure 2:
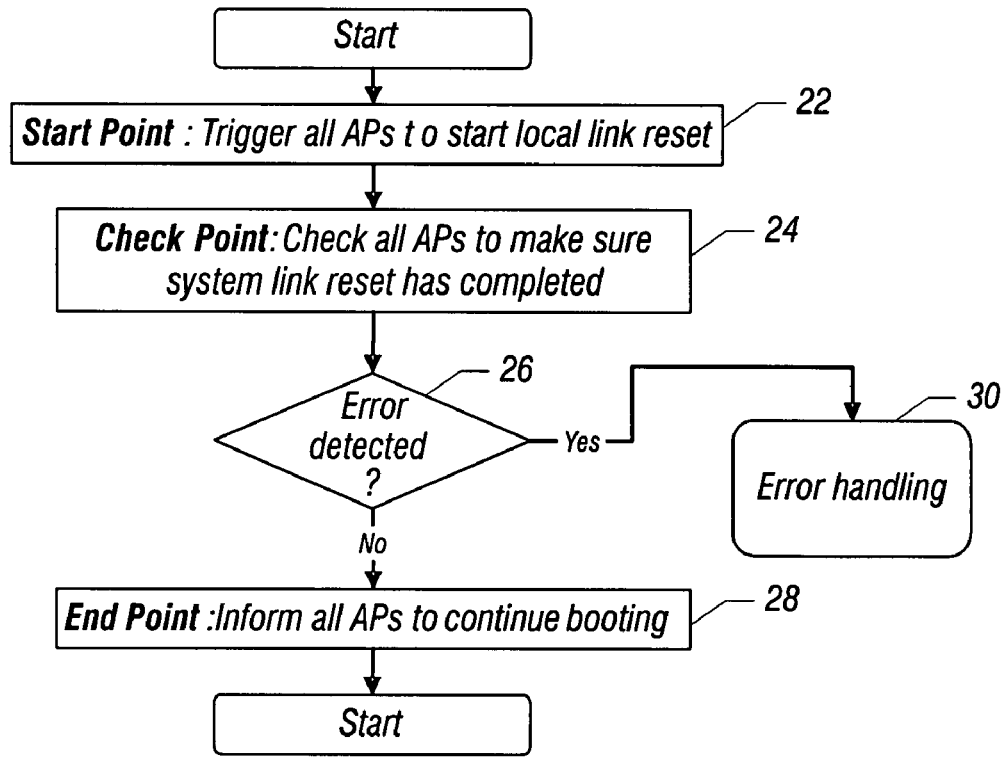
FIG. 2 is a flow chart for a sequence in accordance with one embodiment.

Referring to FIG. 2, a sequence is shown that may be executed by the processor 12a. In some embodiments, where the sequence is implemented in software or firmware, it may be initially stored in the memory 14a. However, the sequence may also be implemented by hardware.

At the start point 22, the processor 12a triggers all the application processors to start the local link reset. At the checkpoint 24, all of the application processors are checked by the processor 12a to make sure system link reset has completed. A check at diamond 26 then determines whether an error has been detected. If not, the processor 12a informs all the application processors to continue booting at the end point (block 28). Otherwise, an error handling operation occurs, as indicated at 30.

At the start point, the processor 12a sets the link_reset_begin flag for each processor and each processor begins to reset its local links immediately once it detects this flag. Because the flag write operation also depends on a transaction which is possibly transited through several links, the processor 12a may not trigger an application processor to reset links randomly. Instead, the system may follow a far-to-near order based on the distance of each application processor from the processor 12a. Namely, the resetting begins with the farthest application processors first and progresses toward the processor 12a. Thus, a preceding triggered link reset may be less likely to impact a subsequent triggering operation. At the end, the processor 12a triggers itself as an application processor to reset its own local links.

For example, if the processor 12a is the system boot strap processor, the processors 12b and 12d would be equally close and the processor 12c would be the processor farthest away. Thus, the link_reset_begin flag is written to the register 16 of the processor 12c, followed by a write to the processors 12b and 12d.

Figure 3:
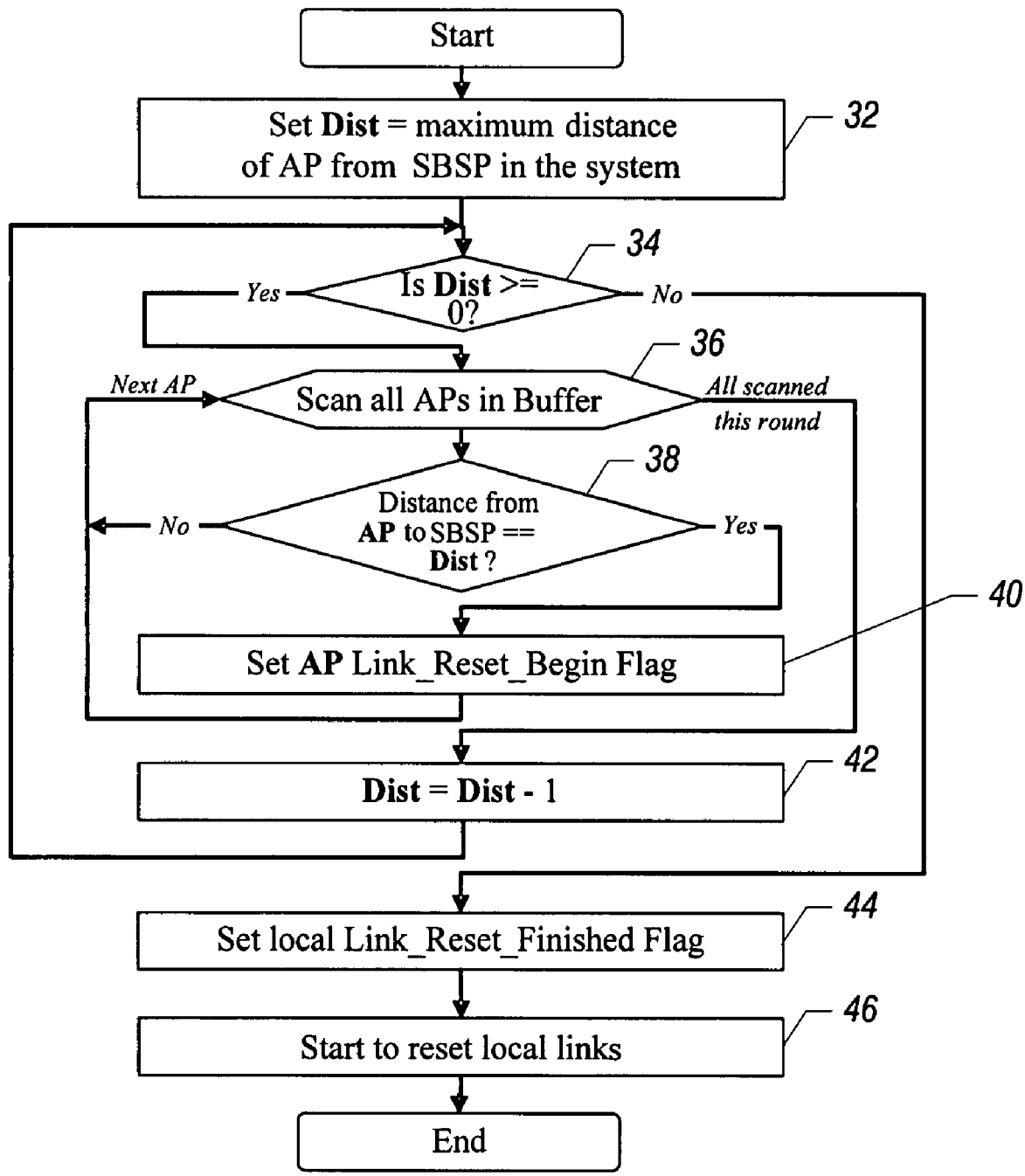
FIG. 3 is a flow chart for another sequence in accordance with one embodiment.

Referring to FIG. 3, the implementation of the start point sequence begins with the system bootstrap processor 12a, setting a variable DIST equal to the maximum distance of any application processor from the system bootstrap processor, as indicated in block 32. Then, a check at diamond 34 determines whether the variable DIST is greater than or equal to zero. If so, all the application processor distances from the bootstrap processor are scanned into a buffer, as indicated at 36. Next, a check at diamond 38 determines whether the distance from a selected application processor to the system bootstrap processor is equal to the variable DIST. If so, at block 40, the application processor's flag link_reset_begin is written. The flow iterates to the next closest application processor. Once all the application processors are scanned, the variable distances set equal to distance minus one (block 42) and the flow iterates.

When the variable DIST is not longer greater than or equal to zero, the local link_reset_finish flag is set at block 44 and then the local links are reset at block 46.

Once an application processor detects that its link_reset_begin flag is set, it tries to reset its local links one by one. The reset involves setting special bits in the related configuration and status registers 16. Because one link may connect with two processors and each processor may try to reset the link, checking link status first avoids duplicated resets. Meanwhile, link status is used to determine whether the reset is successful or not.

The link status is based on whether the link is working in slow speed. This means that the link has not been reset yet and if an application processor encounters one of its links working in low speed, it knows to reset the link. If an application processor finds a link working in high speed, then the link has been reset successfully, either by itself or another processor, and the link may be skipped. If the link is in a resetting state, the reset has not completed and the link may be skipped by an application processor on this round to be checked in a subsequent round. If the link is in the failure state, the link has not been set to the high speed and the link status check is stopped, the local_failure flag is set, and the system waits for error handling.

An application processor may check its local link status in a round robin fashion in one embodiment. If all the links are working in high speed, the application processor sets the local_success flag and waits for the link_reset_finish flag. Otherwise, if a link error is found, a timeout occurs or a maximum retry number is reached, the application processor sets the local_failure flag and waits for error handling.

The processor 12a checks the flags in the registers 16 of all the application processors to make sure system link reset has been completed. In the checkpoint, the processor 12a may follow a near-to-far order to check link reset flags of application processors. This order is used because, if only the near processors have completed their link reset successfully, the access through these nearer links to the farther processors can be guaranteed. Meanwhile, if there is any error detected by the processor 12a, an error handling process is invoked.

Figure 4:
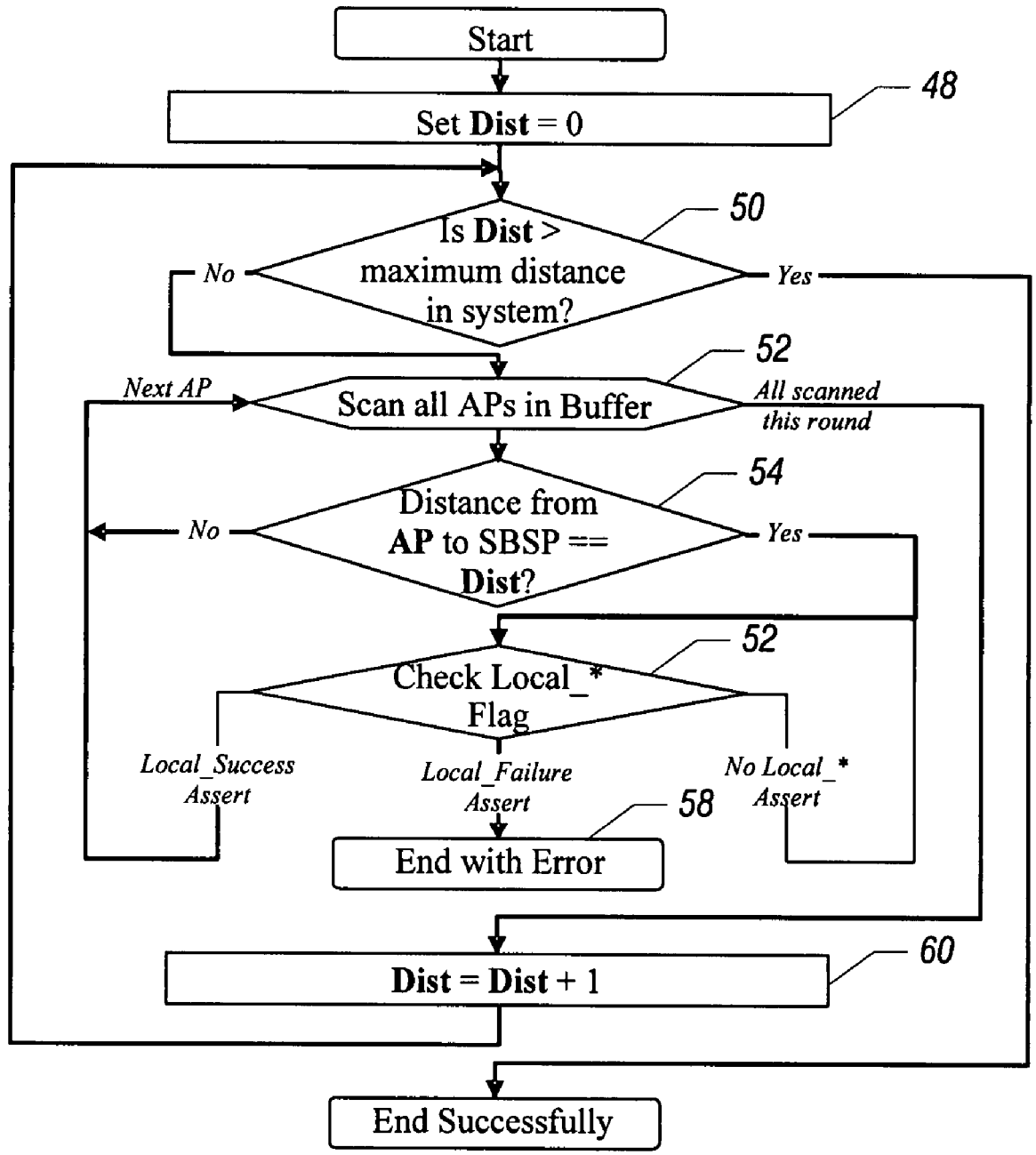
FIG. 4 is a state diagram for resetting the links in accordance with one embodiment.

Referring to FIG. 4, the checkpoint sequence begins at block 48 with the variable DIST set equal to zero by the processor 12a. A check at diamond 50 determines whether the variable DIST is greater than the maximum distance in the system. If not, all the application processors are scanned at 52. A check at diamond 54 determines whether the distance from a selected application processor to the processor 12a is equal to the variable DIST. If so, no local success or failure flag is asserted and the local success or failure flag is checked at block 56. If there is success, the flow iterates, if there is failure, the flow ends with an error, as indicated in block 58. Once all the application processors have been scanned at 52, the variable DIST is incremented at 60 and the flow iterates back to the beginning.

At the end point, the processor 12a simply informs all the application processors to continue booting. As all the application processors have finished link reset, the processor 12a can write the link_reset_finish flag to the registers 16 of all the application processors in any order.

In some embodiments, parallel link reset improves the system link reset performance, compared to a serial reset mode. In some embodiments, firmware can make all the processors handle link reset in parallel so the system boot time can be reduced. Some embodiments can be implemented in software without extra hardware support.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer readable medium storing instructions that enable a bootstrap processor to:
    before transitioning links of a link based system from a slower to a higher link speed, trigger a plurality of application processors to reset links in parallel; and
    inform the application processors to continue booting after links have been reset.

2. The medium of claim 1 further storing instructions to enable the application processors to begin resetting links starting with the application processor farthest from said first bootstrap processor.

3. The medium of claim 2 further storing instructions to enable application processors to determine whether a link needs to be reset based at least in part on the speed at which the link is operating.

4. The medium of claim 3 further storing instructions that enable the application processors to set a flag to indicate that links have been successfully reset.

5. The medium of claim 4 further storing instructions to enable the bootstrap processor to initiate the resetting of the links of the application processors and finally to reset its own links.

6. The medium of claim 5 further storing instructions that enable the bootstrap processor to check link reset flags starting with the application processor nearest the bootstrap processor and proceeding from the nearest application processor to the farthest application processor.

7. A system comprising:
    a plurality of application processors; and
    a bootstrap processor coupled to said application processors to control said application processors and to trigger said application processors to reset links before transitioning from a slower to a higher link speed and to inform the application processors to continue booting after links have been reset.

8. The system of claim 7, said bootstrap processor to cause the application processors to reset links starting with the application processor farthest from said bootstrap processor.

9. The system of claim 8, said application processors to determine whether a link needs to be reset based at least in part on the speed at which the link is operating.

10. The system of claim 9, said application processors to set a flag to indicate that links have been successfully reset.

11. The system of claim 10, said bootstrap processor to initiate the resetting of links of the application processors and finally to reset its own links.

12. The system of claim 11, said bootstrap processor to check link reset flags starting with the application processor nearest the bootstrap processor and proceeding from the nearest application processor to the farthest application processor.

* * * * *